Jan. 30, 1951 — J. DOMINICK — 2,539,819
FOG LENS ATTACHMENT
Filed Aug. 20, 1946
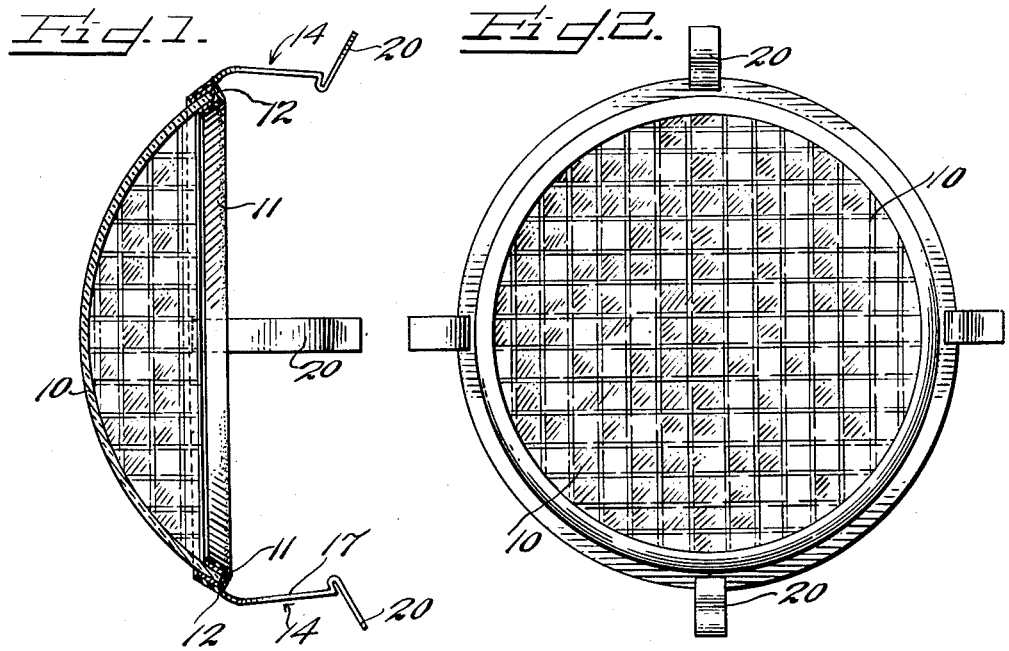
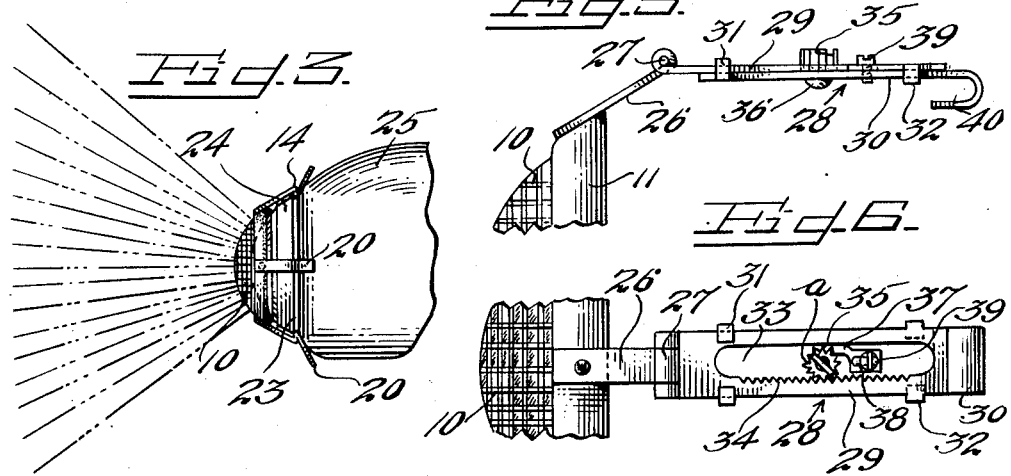
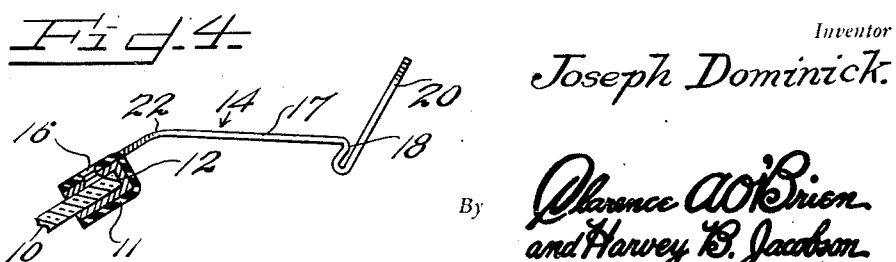
Inventor
Joseph Dominick.
By Clarence A. O'Brien
and Harvey B. Jacobson
Attorneys Patented Jan. 30, 1951

2,539,819

UNITED STATES PATENT OFFICE 2,539,819

FOG LENS ATTACHMENT

Joseph Dominick, Philadelphia, Pa.

Application August 20, 1946, Serial No. 691,798

2 Claims. (Cl. 240—46.59)

This invention relates to fog lens attachments or to other attachments to be removably mounted on the headlights of automotive vehicles, and it has for its main object to provide a simple and effective attachment which may be mounted and removed with ease and which nevertheless secures a perfect seat.

A further object of the invention consists in providing an attachment seating the additional or fog lens in such manner on the headlight that the space between the two lenses is tightly sealed in a water and air tight manner.

A further object of the invention consists in providing means for holding the fog lens and the parts connected therewith which are easily adjustable and are adaptable to the headlights and to the specific arrangement and location of the same so that said means are capable of holding said fog lens tightly and firmly against the lens of the headlights.

Further objects will be apparent from a more specific description of the invention.

Fog lenses and similar equipment such as blackout equipment and the like have to be attached to the existing headlights of automotive vehicles temporarily and have to be removed when the emergency ceases. In the case of fog lenses this is due to the fact that white light is reflected by small water drops suspended in the air or by large drops falling through the air in sufficient density to such an extent that a back glare is produced, while illumination in front ceases. This condition may be improved by using monochromatic light of the shorter wave lengths, amber colored light being usually chosen. Such monochromatic amber colored light is, however, not suitable for normal use as it reduces the obtainable illumination very markedly. Therefore, this type of light is only usable in the above explained case and has to be removed as soon as the emergency ceases. Fog lenses are therefore always removable and must be capable of quick and easy attachment and detachment.

The attachment of fog lenses on the headlights is, however, connected with certain difficulties. The headlights are frequently mounted behind the fenders and merely the lens and lens mount is projecting. Glass lenses can only be used if fixedly mounted and firmly held and such mounting is difficult to obtain on account of the spherical or curved shape of the headlight lenses. If mounted at a distance water penetrates into the space between the lens, is evaporated by the heat of the beam and condenses on the fog lenses which is cooled by the cold air, thus reducing the illumination obtained very markedly.

According to the invention the fog lens is attached to the headlight in such a manner that the space between the fog lens and the headlight lens is tightly sealed, so that neither the outer fog carrying air nor water can penetrate into the said space. This seal is obtained by means of clips which are adjustable for the individual vehicle or adjustable in general and which may be held on the rim of the headlight on the fender or at other places by means of easily mountable small attachment means. The fog lens may therefore be slipped into its place and held securely without difficulty, at a distance from the headlight lens without the disadvantages associated with such an arrangement.

Two embodiments of the invention are illustrated in the drawings by way of example. The invention is, however, not limited to these embodiments as will be clear to the expert from the following specification, indicating the principles and technical methods to be employed to carry the invention into effect.

The invention is illustrated in the accompanying drawings in which:

Figure 1 is an elevational sectional view of the headlight attachment according to the invention.

Figure 2 is a front view of the attachment.

Figure 3 is an elevational side view of the attachment when mounted on the headlight of a car.

Figure 4 is a sectional view of a clip used for attaching the device on the car.

Figure 5 is an elevational side view of another modification of the clip attachment, and Figure 6 is a plan view of the modification of the clip shown in Figure 5.

According to the modification of the invention illustrated in Figures 1–4, a fog lens 10 of amber colored glass, or the like is used, which has preferably the shape of a spherical segment, so that it will fit over most types of headlights now in use and will cover them completely. Around the border of the segment a rubber gasket 11 is arranged within which the rim or edge of the fog lens is embedded. The rubber gasket is channel or U-shaped in cross section, the rim 12 of the lens being inserted into the channel between the legs of the U-shaped gasket. To this gasket a number of clips 14 is secured, the number being dependent on the size and on other conditions. The purpose of these clips is to hold the rubber gasket 11 on the fog lens 10 tightly against the headlight lens and/or the headlight rim so that the attachment fits perfectly. As a rule four or more such clips are arranged.

The purpose of the channel shaped rubber gasket is two fold; it provides a tight impervious mounting for the fog lens and it moreover provides a seal for the attachment which excludes the penetration of moisture between the headlamp and the fog lens. As the fog lens has to be used under conditions which promote the collection or condensation of water and as water collecting in front of the headlight will greatly impair the use of the headlights, it is desirable that the accumulation of condensed or collected water particles on the headlight lens or in the closed space between the headlight and the fog lens be suppressed.

The clips 14 are best riveted to the gasket 11 as shown at 16 in Figure 4. They may simply consist in strips, or bands suitably bent to conform themselves to the shape of the headlight. The slight inward bending at 22 is used to produce an inwardly directed pressure which is of advantage as will be seen below. Near its end portion 20 the strip is bent sharply so that it forms an inwardly projecting tongue or hook 18 arranged at an acute angle to the strip 17 itself. The end 20 of the strip may project outwardly in the direction in which the tongue was bent and it forms a handle by means of which the strip is engaged or disengaged.

The tongue or hook 18 may be inserted into the groove or space 23 behind the annular rim 24 of the headlight which, as a rule, surrounds the same and is accessible even in the event that the headlights are located within the fenders 25, guards or other parts of a car. By virtue of the inward pressure obtained by means of the slight bending at 22 the tongue or hook cannot disengage itself but will be firmly seated behind the annular rim portion 24 once it has been seated in the groove 23.

With the attachment seated, as shown in Figure 3, the rubber gasket 11 is firmly held by the clips and is pressed against the lens and/or the rim of the headlight 10.

Where the circumferential annular ring cannot be engaged in this way or where for other reasons a different construction is preferred the rubber gasket 11 may carry short strips 26 (Figures 5 and 6) fastened to it by means of rivets, which end in hinges 27 carrying hooked adjustable clips 28. These adjustable clips comprise strips 29, 30, capable of gliding along each other, each held by guiding lugs 31, 32, fixed on the other strips. In order to adjust the position of the inner strip 30, the outer strip 29 is provided with a slot 33 having a toothed or corrugated portion 34 on one side. A screw projecting from the inner strip may directly engage one of the teeth or corrugations if desired. In Figures 5 and 6, however, a small ratchet wheel 35 is shown, which is secured on the inner strip 30 by means of a rivet 36 and which is held by a pawl 37 provided with a slot 38 which is fixed on the strip 30 by means of a screw 39. It will be obvious that when the screw is loosened and the pawl 37 is withdrawn from the ratchet wheel 35 the latter may be turned and moved along the toothed edge; the inner strip 30 may thus be brought into any desired position with respect to the outer strip 29.

The inner strip 30 is bent around so as to form a loop 40 of hook-shape which may engage slots or projecting hoops or bails (not shown) in or on the fender. The adjustability of the holding clips produces a tight fitting of the rubber gasket on the headlight lens without any difficulty.

It will be seen that the arrangement as shown and described not only facilitates the mounting and dismounting of a fog lens, but also avoids the disadvantages which are associated with most fog lens attachments.

Changes not affecting the general idea may be made without departing from the invention.

I claim:

1. A removable fog lens attachment of the type having a curved lens body of spherical segment shape held between the flanges of an annular channel shaped rubber gasket, adapted to be pressed against the headlight, comprising tensioning clip members fixed to said rubber gasket, provided with means for drawing the rubber gasket radially and outwardly and axially, said means including a substantially axial rib portion inwardly bent to form a hook attachable behind the rim portion of the headlight and a portion adjacent to said axial portion and inclined toward the axis at an acute angle, the clip members being attached to the gasket by means of said inclined portion, two strips sliding along each other between said inclined portion and the hook shaped portion of the clip members, one of said strips being provided with a toothed rack like edge, the other being provided with a ratchet meshing with the toothed rack like edge, and means on said second strip for locking the ratchet wheel in order to fix the position with respect to the first named strip.

2. A removable fog light attachment of the type having a curved lens body of spherical segment shape, held between the flanges of an annular channel shaped rubber gasket, adapted to be pressed against the headlights, comprising tensioning clips fixed to said rubber gasket, said clips being provided with sections riveted to the channel shaped rubber gasket and projecting outwardly and radially substantially in the plane defined by the flanges of the said rubber gasket, said sections being provided at their end with hinges, and further sections hinged to the aforesaid outwardly and radially projecting sections and provided with means for adjusting the length and provided with hooked ends adapted to be attached behind the rim portion, and pulling the attachment axially, said axial pull when transmitted to the section riveted to and radially projecting from the gasket, exercising a combined radial and axial force pressing the attachment against the headlight and producing a tight seal between the said parts.

JOSEPH DOMINICK.

REFERENCES CITED

The following references are of record in the file of this patent:

UNITED STATES PATENTS

| Number | Name | Date |
|---|---|---|
| 831,803 | Schindewolf | Sept. 25, 1906 |
| 1,322,044 | Otte | Nov. 18, 1919 |
| 1,507,371 | Goodridge | Sept. 2, 1924 |
| 1,856,073 | Graham | May 3, 1932 |
| 2,107,801 | Query | Feb. 8, 1938 |
| 2,349,853 | Ebert | May 30, 1944 |

FOREIGN PATENTS

| Number | Country | Date |
|---|---|---|
| 196,515 | Switzerland | Mar. 15, 1938 |